United States Patent
Jeon

(10) Patent No.: US 7,867,659 B2
(45) Date of Patent: Jan. 11, 2011

(54) HUMIDIFICATION SYSTEM FOR FUEL CELL

(75) Inventor: Yei Sik Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 311 days.

(21) Appl. No.: 12/001,601

(22) Filed: Dec. 11, 2007

(65) Prior Publication Data
US 2008/0093752 A1    Apr. 24, 2008

(30) Foreign Application Priority Data
Sep. 6, 2007    (KR) .................... 10-2007-0090683

(51) Int. Cl.
*H01M 8/06* (2006.01)
(52) U.S. Cl. .................... 429/413; 429/414; 429/444; 429/450
(58) Field of Classification Search ............. 429/413, 429/414, 450, 444; 261/100, 105, 106
See application file for complete search history.

(56) References Cited

U.S. PATENT DOCUMENTS 5,996,976 A * 12/1999 Murphy et al. ............ 261/104
6,545,609 B2 * 4/2003 Shimanuki et al. ........ 340/607
6,872,484 B2 * 3/2005 Katagiri et al. ............ 429/414

FOREIGN PATENT DOCUMENTS

| EP | 1469546 | 10/2004 |
|---|---|---|
| JP | 2002-075422 | 3/2002 |
| JP | 2004-028490 | 1/2004 |
| JP | 2004-071349 A | 3/2004 |
| JP | 2004-273350 A | 9/2004 |
| JP | 2006-114415 | 4/2006 |

* cited by examiner

*Primary Examiner*—Raymond Alejandro
(74) *Attorney, Agent, or Firm*—Edwards Angell Palmer & Dodge LLP; Peter F. Corless

(57) ABSTRACT

The present invention provides a humidification system for a fuel cell, in which a plurality of membrane humidifiers employing hollow fiber membranes of different kinds having different diameters and pore sizes, or having different numbers of hollow fiber membranes is selectively used according to the amount of current generated from a fuel cell stack or a vehicle output, thus adjusting the humidification amount for dry air to be supplied to a fuel cell stack, and preventing the flooding phenomenon caused at a cathode and the starvation phenomenon in which the air supply is insufficient at the cathode.

10 Claims, 5 Drawing Sheets

HUMIDIFICATION SYSTEM FOR FUEL CELL

CROSS-REFERENCE TO RELATED APPLICATION

This application claims the benefit under 35 U.S.C. §119(a) on Korean Patent Application No. 10-2007-0090683, filed on Sep. 6, 2007, the entire contents of which are incorporated herein by reference.

BACKGROUND (a) Technical Field

The present invention relates to a humidification system for a fuel cell. More particularly, the present invention relates to a humidification system for a fuel cell which can adjust humidification of dry air to be supplied to a fuel cell stack.

(b) Background Art

A fuel cell system is an electricity generation system that converts chemical energy of fuel directly into electric energy.

The fuel cell system generally comprises a fuel cell stack for generating electricity, a fuel supply system for supplying fuel (hydrogen) to the fuel cell stack, an air supply system for supplying oxygen in air, which is an oxidizing agent required for en electrochemical reaction, to the fuel cell stack, and a heat and water management system for removing reaction heat of the fuel cell stack to the outside of the fuel cell system and controlling the operation temperature of the fuel cell stack.

The fuel cell system having the above configuration generates electricity by the electrochemical reaction of hydrogen as fuel and oxygen in the air and exhausts heat and water as reaction by-products.

Meanwhile, the fuel cell system requires humid air to facilitate the chemical reaction. The humidification is carried out by directly supplying water to the fuel cell stack by using a hollow fiber membrane or a membrane in the form of a film, or by exchanging moisture of supersaturated humid air discharged from the fuel cell stack with dry air from the outside.

FIG. 1 is a diagram showing the state where humid air is supplied by a conventional humidification system for a fuel cell. As shown in the figure, the dry air from the outside is forcibly blown by a blower 1 to pass through a membrane humidifier 2 and supersaturated humid air discharged from an outlet of a fuel cell stack 3 is passed through the membrane humidifier 2 (then discharged to the outside air) such that the humidification is achieved by moisture exchange between the supersaturated humid air and the dry air. The thus humidified air is supplied to the fuel cell stack 3.

The membrane humidifier 2 is a gas-to-gas membrane humidifier employing hollow fiber membranes. In the event that such a membrane humidifier 2 is used, since it is possible to highly integrate hollow fiber membranes having a large contact surface area, a sufficient humidification of the fuel cell stack 3 is achieved even with a small capacity. Moreover, since the moisture and heat contained in the unreacted gas discharged at a high temperature from the fuel cell stack 3 are collected and reused, it is possible to save the moisture and energy required for the humidification of the fuel cell stack 3.

One of the factors directly influencing the operation performance of the fuel cell system is to water content. Particularly, more than a predetermined amount of moisture must be supplied to an electrolyte membrane and an ionomer in a catalyst layer of a membrane electrode assembly (MEA) to obtain the maximum performance of the ion conductivity of the electrolyte membrane and the ionomer.

Here, the function of the membrane humidifier 2 is to supply the moisture and heat contained in the unreacted gas discharged at a high temperature from the fuel cell stack 3 to dry gas at a room temperature supplied to the fuel cell stack 3 through the membrane surface, thus achieving the humidification and temperature maintenance of the fuel cell stack 3.

Conventional membrane humidifiers mainly comprise a bundle of hollow fiber membranes through which dry air passes and a housing through which the supersaturated humid air discharged from the fuel cell stack 3 passes. In this case, the housing has a substantially cylindrical shape including an inlet and an outlet through which the dry air and the supersaturated humid air pass.

However, the conventional humidification systems have the following drawbacks.

First, humidification more than a certain level can increase the amount of water generated from a cathode in a high current and high output region while it is suitable for a low current and low output region.

The increased amount of water generated from the cathode in the high current and high output region can increase the material transfer resistance at the cathode, causing a flooding problem. This, in turn, can block the supply of air at the cathode and cause a problem of starvation of air. As a result, deterioration of the fuel cell catalyst can be accelerated and durability of the fuel cell can be reduced remarkably.

Accordingly, in the high current and high output region, it is necessary to reduce the humidification amount to a certain level. Nonetheless, the conventional membrane humidifiers show little difference in the humidification amount between the low current region and the high current region; the high current region has a humidification performance of more than RH 80% which is a level similar to the low current region. Moreover, the conventional membrane humidifiers have drawbacks in that in the high current region, with an increase in the amount of air flow, a pressure drop is increased and the load of the blower is raised.

The information disclosed in this Background section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to solve the above problems, and an object of the present invention is to provide a humidification system for a fuel cell, which can adjust the humidification amount for dry air to be supplied to a fuel cell stack and prevent the flooding and starvation problems as described.

In a preferred embodiment, the present invention provides a humidification system for a fuel cell, the humidification system comprising: a first membrane humidifier including at least one hollow fiber membrane in a first housing; a second membrane humidifier including at least one hollow fiber membrane in a second housing, the diameter of the hollow fiber membrane being larger and the pore size of the hollow fiber membrane being smaller than those of the hollow fiber membrane of the first membrane humidifier; and a flow path switching valve provided at a rear end of the second membrane humidifier for selectively opening or closing a discharge flow path of humidified air to be supplied to a fuel cell stack of the fuel cell.

In another preferred embodiment, the present invention provides a humidification system for a fuel cell, the humidification system comprising: a first membrane humidifier including at least one hollow fiber membrane in a first housing; a second membrane humidifier including at least one hollow fiber membrane in a second housing, the number of the hollow fiber membrane being lower than that of the hollow fiber membrane of the first membrane humidifier; and a flow path switching valve provided at a rear end of the second membrane humidifier for selectively opening or closing a discharge flow path of humidified air to be supplied to a fuel cell stack of the fuel cell.

In the above embodiments, the first and second membrane humidifiers are arranged in parallel with respect to the direction of flow paths through which dry air supplied from outside air is fed into the first and second membrane humidifiers and flow paths through which the humidified air is supplied to the fuel cell stack. The dry air passes through all or part of the hollow fiber membranes and supersaturated humid air discharged from the fuel cell stack of the fuel cell passes inside the first and second housings such that the humidified air can be made by moisture exchange between the dry air and the supersaturated humid air.

Preferably, the flow path switching valve is a pressure valve that can be automatically opened when the pressure of air is increased beyond a predetermined level.

Also preferably, the flow path switching valve may be an electronic valve that can be opened or closed according to an electric signal applied from the outside. In which case, the system may further comprise: a current sensor for detecting the amount of current generated and output from the fuel cell stack; and a controller for determining a high current region from an output signal from the current sensor and outputting a control signal to open the electronic valve in the high current region. In stead of the current sensor, a pedal sensor can be employed.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present systems will be particularly useful with a wide variety of motor vehicles.

Other aspects of the invention are discussed infra.

Figure 1:
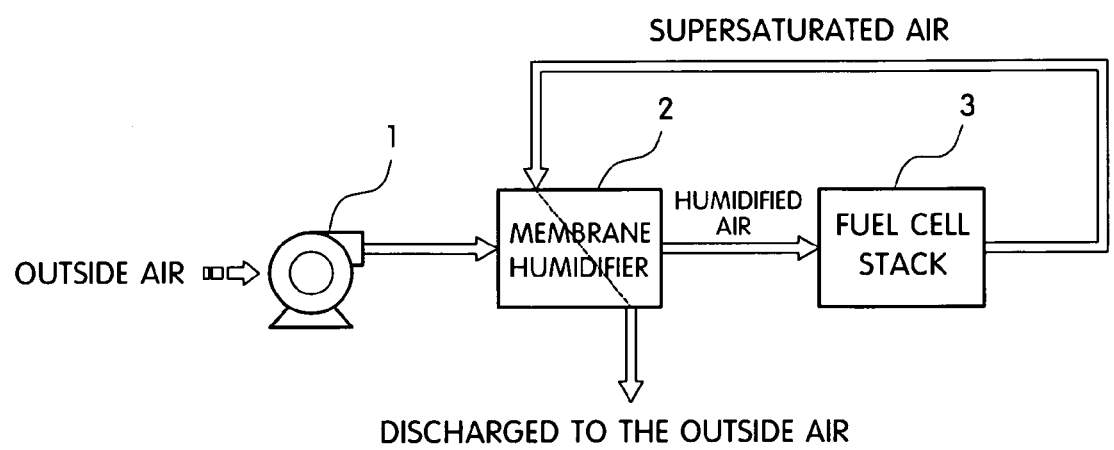
FIG. 1 is a diagram showing the state where humid air is supplied by a conventional humidification system for a fuel cell.

Reference numerals set forth in the Drawings includes reference to the following elements as further discussed below:

| 10: blower | 21: first membrane humidifier |
| 21a: hollow fiber membrane | 22: second membrane humidifier |
| 22a: hollow fiber membrane | 23: flow path switching valve |
| 30: fuel cell stack | |

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

The present invention provides a humidification system for a fuel cell capable of adjusting the humidification amount for dry air according to the amount of current generated by a fuel cell stack or a vehicle output.

Figure 2:
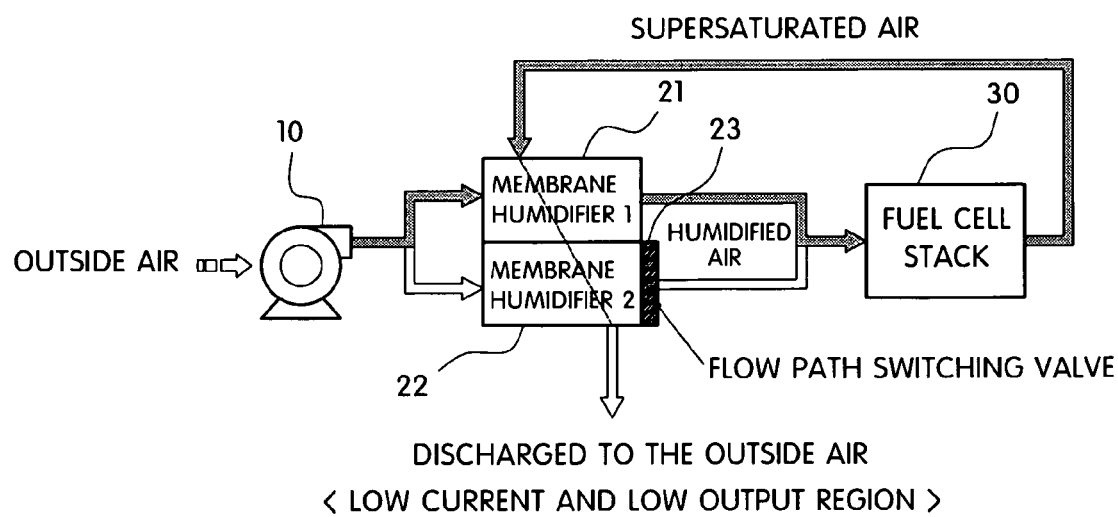
FIG. 2 is a diagram showing the configuration and operational state in a low current and low output region of a humidification system for a fuel cell in accordance with the present invention.
Figure 3:
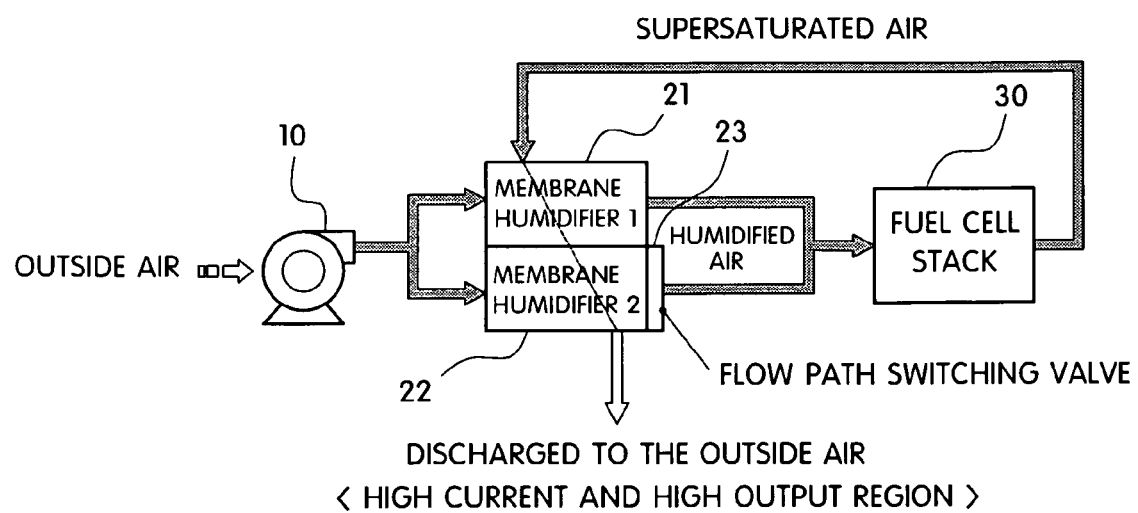
FIG. 3 is a diagram showing the configuration and operational state in a high current and high output region of the humidification system for a fuel cell in accordance with the present invention.

FIG. 2 is a diagram showing the configuration and operational state in a low current and low output region of a humidification system for a fuel cell in accordance with the present invention, and FIG. 3 is a diagram showing the configuration and operational state in a high current and high output-region of the humidification system for a fuel cell in accordance with the present invention.

As shown in the figures, the humidification system of the present invention includes a plurality of membrane humidifiers 21 and 22 employing hollow fiber membranes 21a and 22a.

Hollow fiber membrane bundles including the hollow fiber membranes 21a and 22a are placed in housings of the respective membrane humidifiers 21 and 22. The hollow fiber membranes 21a and 22a employed in the respective membrane humidifiers 21 and 22 have different diameters and pore sizes. That is, the membrane humidifiers 21 and 22 employ the hollow fiber membranes 21a and 22a of different kinds.

In a preferred embodiment of the present invention, as shown in FIGS. 2 and 3, two membrane humidifiers 21 and 22 employing hollow fiber membranes 21a and 22a of different kinds are provided. Specifically, the membrane humidifier 21 employs a bundle of hollow fiber membranes 21a having a smaller diameter and a larger pore size and the membrane humidifier 22 employs a bundle of hollow fiber membranes 22a having a larger diameter and a smaller pore size.

The membrane humidifier 21 employing the bundle of the hollow fiber membranes 21a having a smaller diameter and a larger pore size will be hereinafter referred to as a first membrane humidifier, and the membrane humidifier 22 employing the bundle of the hollow fiber membranes 22a having a larger diameter and a smaller pore size will be hereinafter referred to as a second membrane humidifier.

Figure 4:
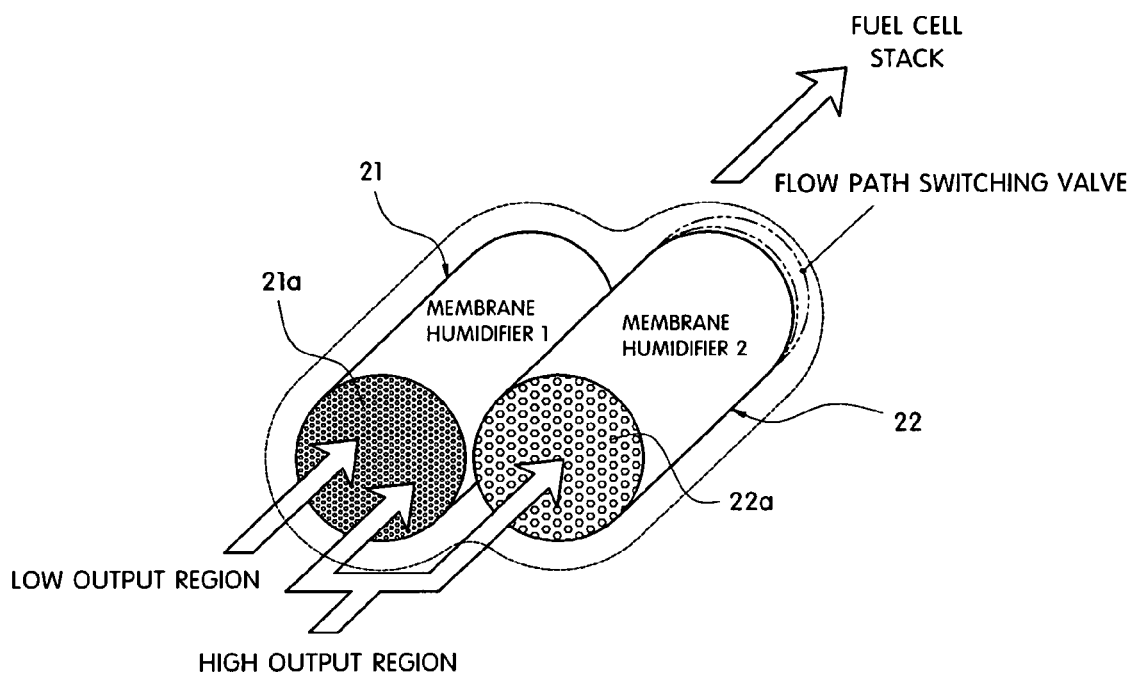
FIG. 4 is a diagram showing the use of membrane humidifiers employing hollow fiber membrane bundles of different kinds in the humidification system of the present invention.

FIG. 4 is a diagram showing the use of membrane humidifiers employing hollow fiber membrane bundles of different kinds in the humidification system of the present invention. As shown in the figure, the first membrane humidifier 21 employs the hollow fiber membranes 21a having a smaller diameter, and the second membrane humidifier 22 employs the hollow fiber membranes 22a having a larger diameter. In terms of the number of hollow fiber membranes, the second membrane humidifier 22 employs a smaller number of hollow fiber membranes 22a having a larger diameter. Although it is not shown in FIG. 4, the pore size of the hollow fiber membranes 22a is smaller than that of the hollow fiber membranes 21a. It is noted that the pores are provided on side wall portion of the membranes, through which moisture exchange occurs.

As shown in the figures, the first and second membrane humidifiers 21 and 22 are arranged in parallel with respect to flow paths for dry air connected to a blower 10 and flow paths for humid air connected to a fuel cell stack 30 and arranged in series with respect to a flow path for supersaturated humid air connected to an outlet of the fuel cell stack 30.

For this, the dry air, fed through the flow paths at the upstream of the respective membrane humidifiers 21 and 22 and the inlets of the housings, passes through the inside of the hollow fiber membranes 21a and 22a placed in the housings of the respective membrane humidifiers 21 and 22 and is discharged through the outlets of the housings of the respective membrane humidifiers 21 and 22 to flow along the flow paths at the downstream of the respective membrane humidifiers 21 and 22. Moreover, flow paths for supersaturated humid air mounted in the two membrane humidifiers 21 and 22 are in communication with each other such that the supersaturated humid air, discharged from the outlet of the fuel cell stack 30, passes through the inside of the housing of the first membrane humidifier through the flow path connected to the outlet of the fuel cell stack 30, and then passes through the inside of the housing of the second membrane humidifier consecutively to be discharged to the outside air.

Accordingly, the dry air forcibly blown by the blower 10 can diverge to the first membrane humidifier 21 and the second membrane humidifier 22 to pass therethrough, and the supersaturated humid air discharged from the outlet of the fuel cell stack 30 can pass through the first membrane humidifier 21 and the second membrane humidifier 22 in turn.

At this time, the humidification for the dry air is achieved by moisture exchange between the supersaturated humid air passing through the first membrane humidifier 21 and the second membrane humidifier 22 in turn and the dry air passing through the inside of the hollow fiber membranes of the respective membrane humidifiers 21 and 22, and the thus humidified air is supplied to the fuel cell stack 30 through the flow path.

Meanwhile, a flow path switching valve 23 for preventing reverse flow and selectively opening and closing the discharge flow path of the second membrane humidifier 22 is provided at the rear end of the second membrane humidifier 22. As the flow path switching valve 23, a passive type pressure valve, which opens the discharge flow path when the pressure of air passing through the second membrane humidifier 22 is increased beyond a predetermined level, may be used.

In the field of valves, the commonly used pressure valve opening and closing the flow path according to the pressures is a pressure valve configured to enable the open and close operation by a pressure applied by the fluid in the flow path and a spring force. In such a known pressure valve, as the spring is deformed by the pressure of the fluid of more than a design pressure level, the flow path in the valve is opened, and if the pressure of the fluid is reduced below the design pressure level, the flow path in the valve is cut off by the elastic force of the spring.

Moreover, as the flow path switching valve 23 at the rear end of the second membrane humidifier 22, an electronic valve, which opens and closes the discharge flow path by an electric signal, may be used. Such an electronic valve is a pressure valve actively controlled by a control signal output from a controller 9. Like a common throttle valve, an electronic valve, in which an actuator is driven by an electric signal and thus a flap is rotated to open and close the flow path, may be used.

In a low current and low output region, the amount of air blown by the blower 10 is small and thus the humid air having a relatively small amount is supplied to the fuel cell stack 30. In a state where the flow path switching valve 23 of the second membrane humidifier 22 is closed by default, the dry air blown by the blower 10 passes through the first membrane humidifier 21 and the thus humidified air is supplied to the fuel cell stack 30.

Like this, in the low current and low output region, a sufficient amount of humidification is achieved only by the first membrane humidifier 21 employing hollow fiber membranes 21a having a small diameter and a larger pore size.

In the case where the passive type pressure valve, which opens the flow path according to the pressure of the fluid, is used, the pressure valve is being closed since the pressure of air in the low current and low output region is low. Accordingly, the discharge flow path of the second membrane humidifier 22 is cut off, and thus air does not flow in the bundle of the hollow fiber membranes 22a having a larger diameter and a smaller pore size.

In contrast, in a high current and high output region where the amount of air blown by the blower 10 is increased, the dry air blown by the blower 10 passes through the first membrane humidifier 21 and the second membrane humidifier 22 at the same time, in a state where the flow path switching valve 23 of the second membrane humidifier 22 is open, and the air humidified by the first membrane humidifier 21 and the second membrane humidifier 22 is supplied to the fuel cell stack 30.

Like this, in the high current and high output region, the first membrane humidifier 21 employing the hollow fiber membranes 21a having a smaller diameter and a larger pore size and the second membrane humidifier 22 employing the hollow fiber membranes 22a having a larger diameter and a smaller pore size are simultaneously used to carry out the humidification, thus adjusting the humidification amount appropriately.

In this case, since the amount of air blown by the blower 10 in the high current and high output region is large, the flow path switching valve 23, i.e., a spring type pressure valve, is opened by the pressure of the large amount of air and, consequently, a portion of air can pass through the bundle of the hollow fiber membranes 22a of the second membrane humidifier 22. Accordingly, the discharge pressure of the humidifier is reduced and, at the same time, the reduced amount of humidified air is supplied to the fuel cell stack 30.

Like this, the flow path switching valve 23, i.e., the spring type pressure valve, is automatically opened when the air pressure in the high current and high output region is increased beyond a predetermined level.

Figure 5:
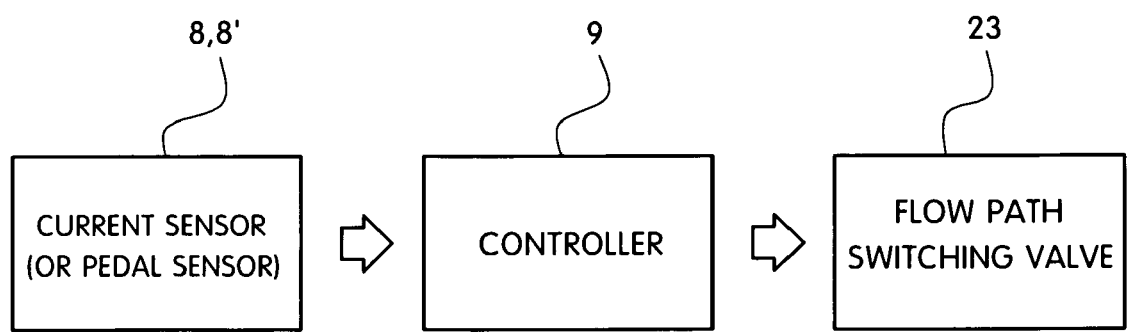
FIG. 5 is a block diagram showing an example of configuration of an electronic valve opened and closed by an electric signal from a controller as a flow path switching valve in the humidification system of the present invention.

In the event that the electronic valve, opened and closed by an electric signal of a controller, is used as the flow path switching valve 23, as shown in FIG. 5, the controller 9 determines a high current region from a current sensor 8 for detecting the amount of current generated and output from the fuel cell stack 30 and outputs a control signal to open the flow path switching valve 23 in the high current region.

As another method, the controller 9 determines a high output region according to a depression amount of an accelerator pedal based on a signal input from a pedal sensor 8' for detecting the depression amount of the accelerator pedal (pedal actuation amount) actuated by a driver and outputs a control signal to open the flow path switching valve 23 in the high output region.

In this case, the first membrane humidifier 21 and the second membrane humidifier 22 are simultaneously used to humidify the air.

Of course, if determining the low current and low output region according to the detected value of the pedal sensor 8', the controller 9 outputs a control signal to close the flow path switching valve 23.

In this case, since the flow path of the second membrane humidifier 22 is cut off, the humidification is carried out only by the first membrane humidifier 21.

Although the foregoing description has been given with respect to the case where the two membrane humidifiers employing hollow fiber membranes of different kinds are used, it is possible to achieve the same object of the present invention by employing the hollow fiber membranes of the same kind in the two membrane humidifiers and varying the number of hollow fiber membranes, as another embodiment of the present invention.

That is, the same hollow fiber membranes are used and the numbers of hollow fiber membranes employed in the respective membrane humidifiers are varied so as to adjust a desired humidification amount.

First, the first membrane humidifier has a relatively small number of hollow fiber membranes and the second membrane humidifier has a relatively large number of hollow fiber membranes.

Except for the variation in the number of hollow fiber membranes employed in the first and second membrane humidifiers, the other components such as the flow path switching valve installed in the second membrane humidifier are the same.

The operational state of the flow path switching valve and the effect achieved thereby in accordance with this embodiment of the present invention are the same as described above.

As described above, the present invention provides the humidification system for a fuel cell, in which a plurality of membrane humidifiers using hollow fiber membranes of different kinds having different diameters and pore sizes, or having different numbers of hollow fiber membranes is selectively used according to the amount of current generated from a fuel cell stack or a vehicle output, thus adjusting the humidification amount for dry air to be supplied to a fuel cell stack.

Especially, since the humidification amount can be adjusted appropriately according to the conditions, it is possible to prevent the flooding phenomenon at the cathode of the fuel cell stack and the starvation phenomenon in which the air supply is insufficient at the cathode.

Moreover, it is possible to prevent deterioration of the fuel cell catalyst and deterioration of the durability due to the starvation phenomenon. Furthermore, it is possible to reduce the load of the blower by reducing the pressure drop caused by the increase in the air flow amount.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A humidification system for a fuel cell, the humidification system comprising:
   a first membrane humidifier including at least one hollow fiber membrane in a first housing;
   a second membrane humidifier including at least one hollow fiber membrane in a second housing, the diameter of the hollow fiber membrane being larger and the pore size of the hollow fiber membrane being smaller than those of the hollow fiber membrane of the first membrane humidifier; and
   a flow path switching valve provided at a rear end of the second membrane humidifier for selectively opening or closing a discharge flow path of humidified air to be supplied to a fuel cell stack of the fuel cell,
   wherein the first and second membrane humidifiers are arranged in parallel with respect to the direction of flow paths through which dry air supplied from outside air is fed into the first and second membrane humidifiers and flow paths through which the humidified air is supplied to the fuel cell stack; and the dry air passes through all or part of the hollow fiber membranes and supersaturated humid air discharged from the fuel cell stack of the fuel cell passes inside the first and second housings such that the humidified air can be made by moisture exchange between the dry air and the supersaturated humid air.

2. The system of claim 1, wherein the flow path switching valve is a pressure valve that can be automatically opened when the pressure of air is increased beyond a predetermined level.

3. The system of claim 1, wherein the flow path switching valve is an electronic valve that can be opened or closed according to an electric signal applied from the outside.

4. The system of claim 3, further comprising:
   a current sensor for detecting the amount of current generated and output from the fuel cell stack; and
   a controller for determining a high current region from an output signal from the current sensor and outputting a control signal to open the electronic valve in the high current region.

5. The system of claim 3, further comprising:
   a pedal sensor for detecting a depression amount of an accelerator pedal actuated by a driver; and
   a controller for determining a high output region from an output signal from the pedal sensor and outputting a control signal to open the electronic valve in the high output region.

6. A humidification system for a fuel cell, the humidification system comprising:
   a first membrane humidifier including at least one hollow fiber membrane in a first housing;
   a second membrane humidifier including at least one hollow fiber membrane in a second housing, the number of the hollow fiber membrane being lower than that of the hollow fiber membrane of the first membrane humidifier; and
   a flow path switching valve provided at a rear end of the second membrane humidifier for selectively opening or closing a discharge flow path of humidified air to be supplied to a fuel cell stack of the fuel cell,
   wherein the first and second membrane humidifiers are arranged in parallel with respect to the direction of flow paths through which dry air supplied from outside air is fed into the first and second membrane humidifiers and flow paths through which the humidified air is supplied to the fuel cell stack; and the dry air passes through all or part of the hollow fiber membranes and supersaturated humid air discharged from the fuel cell stack of the fuel cell passes inside the first and second housings such that the humidified air can be made by moisture exchange between the dry air and the supersaturated humid air.

7. The system of claim 6, wherein the flow path switching valve is a pressure valve that can be automatically opened when the pressure of air is increased beyond a predetermined level.

8. The system of claim 6, wherein the flow path switching valve is an electronic valve that can be opened or closed according to an electric signal applied from the outside.

9. The system of claim 8, further comprising:
a current sensor for detecting the amount of current generated and output from the fuel cell stack; and
a controller for determining a high current region from an output signal from the current sensor and outputting a control signal to open the electronic valve in the high current region.

10. The system of claim 8, further comprising:
a pedal sensor for detecting a depression amount of an accelerator pedal actuated by a driver; and
a controller for determining a high output region from an output signal from the pedal sensor and outputting a control signal to open the electronic valve in the high output region.

\* \* \* \* \*